US006046865A

United States Patent [19]

Ihara

[11] Patent Number: 6,046,865

[45] Date of Patent: Apr. 4, 2000

[54] ZOOM LENS BARREL

[75] Inventor: Yuji Ihara, Tokyo, Japan

[73] Assignee: Nikon Corporation, Tokyo, Japan

[21] Appl. No.: 09/168,984

[22] Filed: Oct. 9, 1998

[30] Foreign Application Priority Data

Oct. 17, 1997 [JP] Japan .................................... 9-299589

[51] Int. Cl.$^{7}$ ....................................................... G02B 7/02

[52] U.S. Cl. ............................................ 359/819; 359/701

[58] Field of Search .................................... 359/618, 701, 359/819

[56] References Cited

U.S. PATENT DOCUMENTS

| | | | |
|---|---|---|---|
| 5,760,972 | 6/1998 | Fukino | 359/701 |
| 5,917,659 | 6/1999 | Yamanouchi | 359/700 |

FOREIGN PATENT DOCUMENTS 8-146278 6/1996 Japan .

*Primary Examiner*—Scott J. Sugarman
*Assistant Examiner*—Tim Thompson
*Attorney, Agent, or Firm*—Morgan, Lewis & Bockius LLP

[57] ABSTRACT

A zoom lens barrel includes a zoom ring supported by a fixed barrel constituting a barrel body so as to be freely rotative; a zoom cam ring disposed inside the zoom ring in the direction of an optical axis; a first connecting portion for connecting the zoom ring and the zoom cam ring; a first lens holder which moves in the direction of an optical axis; a driving ring which is supported by the fixed barrel at a position behind a lens from the first connecting portion by the fixed barrel; a straightly moving ring which is substantially disposed in a space defined between the zoom ring and the zoom cam ring, restrained from rotating by the fixed ring; and a lens holding ring which holds a second lens, which is disposed in front of the first lens from the first connecting portion and helicoidally coupled substantially with the straightly moving ring in a space, the lens holding ring being rotatively driven by the driving ring and relatively movable in the direction of the optical axis, wherein the lens holding ring moves in the direction of the optical axis by a rotative drive of the driving ring through the straight moving ring at the time of focussing.

7 Claims, 4 Drawing Sheets

A
1
2
3
3a
5
7
9
11
21
23
25
27
31
33
35
37
39
41
51
53
55
57
59
61
63
65
67
69
71
81
87
95
95a
L

ZOOM LENS BARREL

This application claims the benefit of Japanese patent application No.9-299589 which is hereby incorporated by reference.

BACKGROUND OF THE INVENTION

1. Field of the Invention

The present invention relates particularly to a zoom lens barrel which will be most appropriate for a camera.

2. Related Background Art

In recent years, a single zoom lens has been widely used in a single-lens reflex camera instead of a plurality of lenses having different focal lengths to avoid complicated operations required when exchanging lenses and to avoid non-handiness in carrying the lenses. For example, in a two-group type zoom lens, a zooming mechanism is provided for changing a distance between the first lens group (object side lens group) and the second lens group (camera side lens group) continuously. A photographer can obtain the required focal length within a predetermined range by operating the zooming mechanism.

There exist various types of lens barrels. In Japanese Patent Application Laid-Open No. 8-146278, a two-group type lens barrel having a rotary type zooming mechanism is disclosed. This lens barrel is composed of a fixed mount fitted to a camera in a bayonet fashion; a fixed barrel united with the fixed mount; a focus ring holding a first lens group; a straightly moving ring on which outer peripheral surface the focus ring is screw engaged; a holder for holding a second lens group; and a zoom cam barrel engaged with the straightly moving ring and the holder respectively using a cam.

The zoom cam barrel is connected with a zoom ring which is operated by hand. A photographer rotates the zoom cam barrel through the zoom ring, whereby the straightly moving ring, i.e. the focus ring, and the holder approach towards each other or move away from each other, so that the zooming is performed. Moreover, in front of the connecting portion of the zoom ring and the zoom cam barrel, a driving ring is rotatably fitted to the tip of outer peripheral portion of the fixed barrel. A key connected with the focus ring is provided extending forward from this driving ring. When the driving ring is operated by hand or automatically rotated, the focus ring moves forward or backward spirally against the straightly moving ring, so that focusing is performed.

In above-described conventional lens barrel, since the driving ring is located in front of the connecting portion of the zoom ring and the zoom cam barrel, it is difficult to shorten the total length of the barrel and consequently it became an obstacle in realizing small size and light weight. Moreover, since the driving ring is fitted to the tip portion of the fixed barrel, the outer diameter of the lens barrel as a whole is apt to be big, and carrying and handling is not easy. In addition, since the zoom ring and the zoom cam barrel are connected with each other via many parts, the fixed barrel is comparatively long and the number of mechanical parts is increased, causing the problem of an increase in manufacturing cost.

SUMMARY OF THE INVENTION

The object of the present invention is to provide a small and light weight zoom lens barrel in which the manufacturing cost is reduced.

To solve the foregoing problem, a zoom lens barrel of the present invention comprises a zoom ring which is supported rotatively by a fixed barrel and rotatively driven at the time of zooming; a zoom cam barrel which is disposed inside the zoom ring and serves to allow an optical lens group to move forward or backward along optical axis direction; a first connecting section which connects the zoom ring and the zoom cam barrel; a straightly moving ring which moves forward and backward together with the zoom cam barrel, the rotation of which is restricted by a restraint portion provided in the fixed barrel; a driving ring which is supported by the fixed barrel rotatively and driven rotatively at the time of focussing; a focus ring which holds an optical lens group composed of at least one optical lens, the focus ring being screw engaged with the straightly moving ring and moving forward or backward along the optical axis direction by its rotation; and a second connecting section which connects the focus ring and the driving ring, wherein the first connecting portion, the restraint portion and the second connecting portion are disposed on the same section plane perpendicular to the optical axis, in at least one spot in the zoom lens barrel.

According to the present invention, the zoom ring and the zoom cam ring constituting a zoom mechanism and the driving ring and the focus ring constituting a focussing mechanism are provided close to each other, whereby the compact size and light weight of the zoom lens barrel can be achieved.

In the foregoing zoom lens barrel of the present invention, the driving ring can be provided inside the fixed barrel, whereby it becomes possible to make an outer diameter of the lens barrel small though the outer diameter of the fixed barrel is set comparatively larger.

In the foregoing zoom lens barrel of the present invention, it is proposed that the zoom ring, the zoom cam barrel and the first link section are molded to form an integrated structure, whereby the number of parts constituting the zoom mechanism is reduced, and a reduction in the number of manufacturing steps and a manufacturing cost can be achieved.

BRIEF DESCRIPTION OF THE DRAWINGS

For a more complete understanding of the present invention and the advantages thereof, reference is now made to the following description taken in conjunction with the accompanying drawings, in which.

DESCRIPTION OF THE PREFERRED EMBODIMENTS

Figure 1:
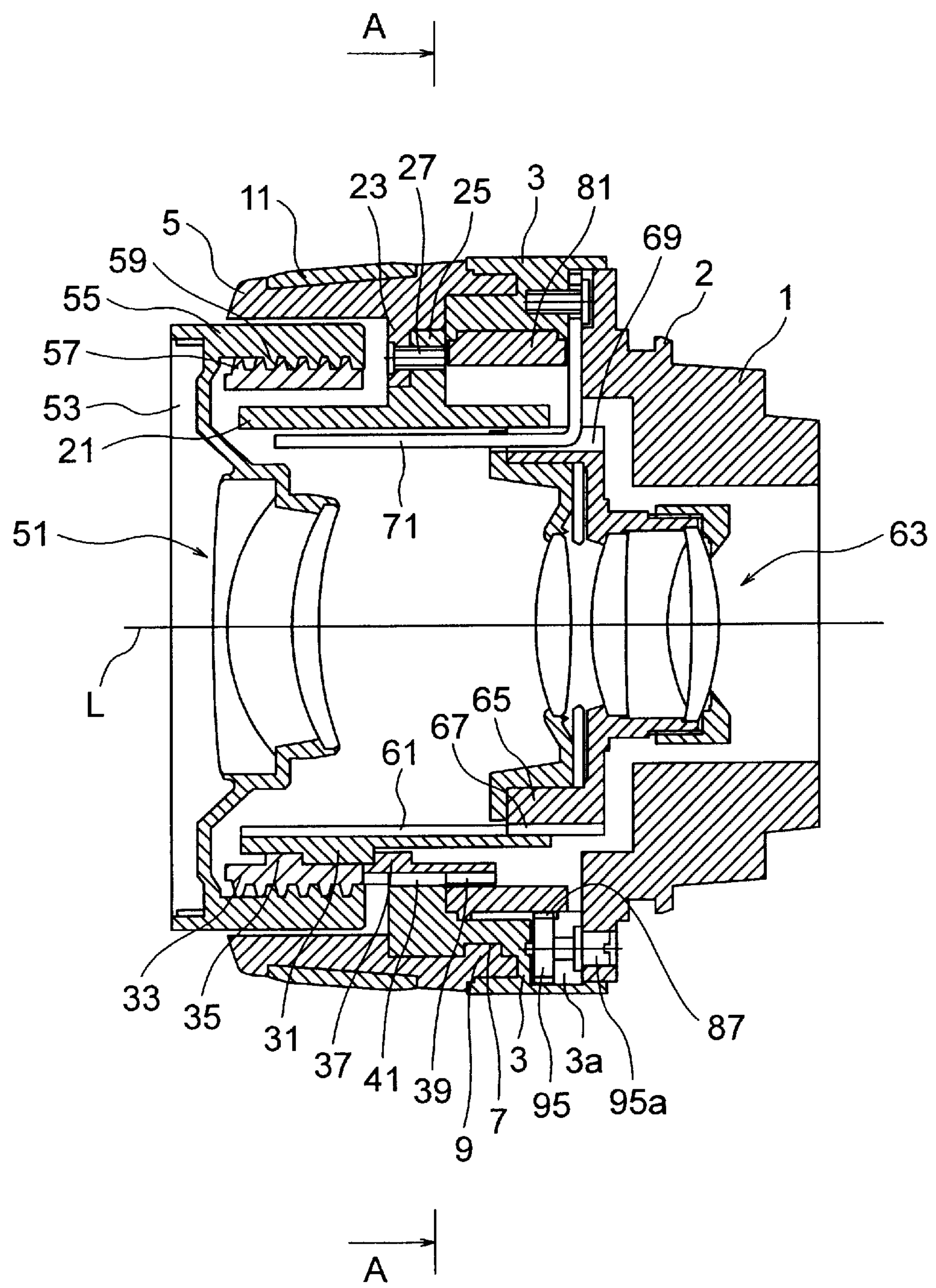
FIG. 1 is a vertical sectional view of a zoom lens barrel according to a first embodiment of the present invention.
Figure 2:
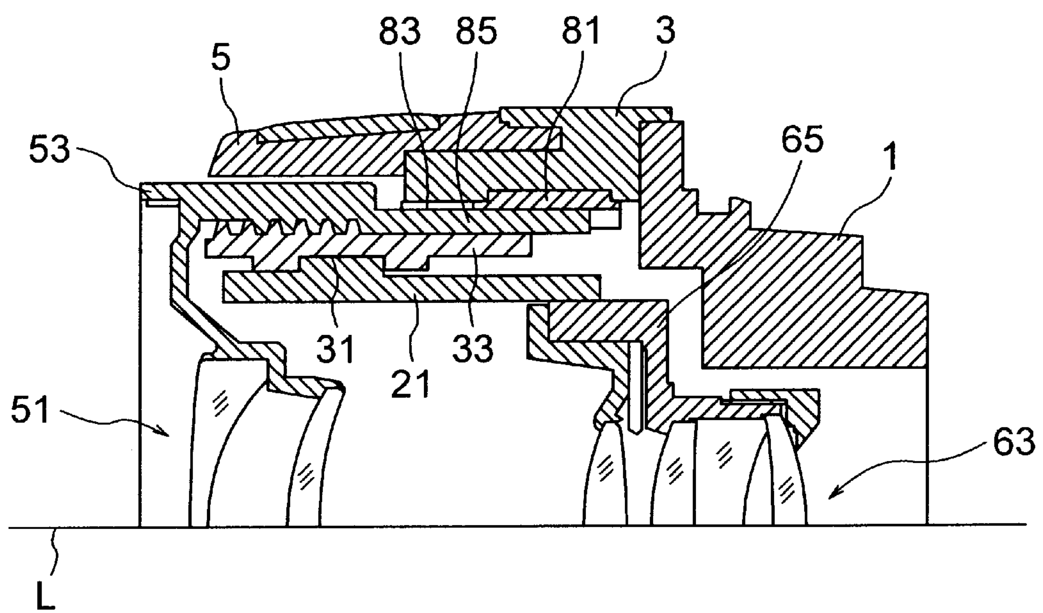
FIG. 2 is a fragmentary vertical sectional view of a portion of the zoom lens barrel which is different from that shown in FIG. 1.
Figure 3:
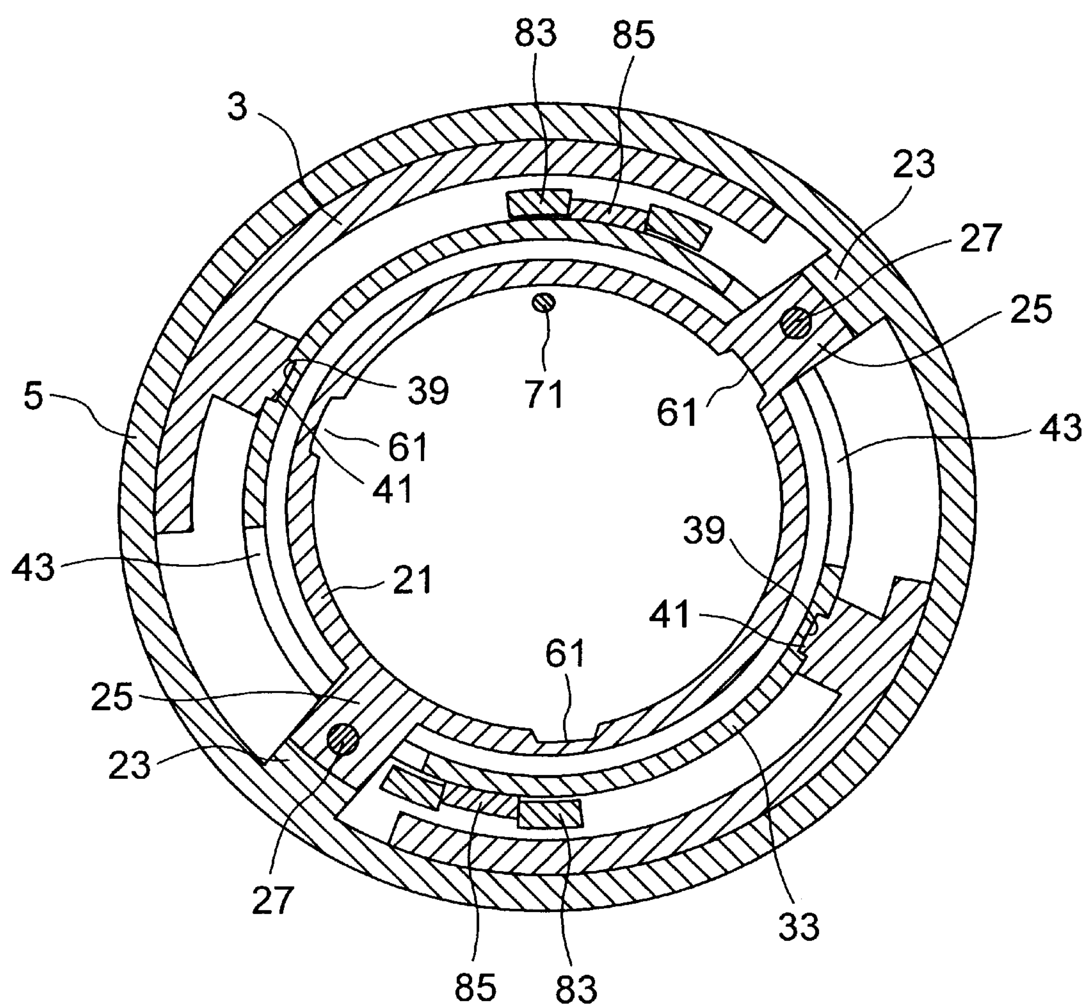
FIG. 3 is a sectional view taken along the line A—A of FIG. 1.

An embodiment of the present invention will be described with reference to the accompanying drawings below. FIG. 1 is a vertical sectional view of a zoom lens barrel according to a first embodiment of the present invention. FIG. 2 is a fragmentary sectional view of a different portion from that of FIG. 1. FIG. 3 is a sectional view taken along the line A—A in FIG. 1.

Referring to FIGS. 1 and 2, the member denoted as reference numeral 1 is a cylindrical fixed mount having steps, which is fitted to a camera (not shown), and a plurality of bayonet lugs 2 are formed on the outer peripheral surface of the fixed mount 1. The cylindrical fixed barrel 3 is fixed to the front end of the fixed mount 1 by a method such as screwing. Moreover, a zoom ring 5 is rotatively supported on the front end of the fixed barrel 3, and a guide groove formed in a part of the outer peripheral surface of the fixed barrel 3 is engaged with a pin 9 formed in the inner peripheral surface of the zoom barrel 5, whereby the zoom ring 5 is allowed to rotate within a predetermined angle range. In FIGS. 1 and 2, reference numeral 11 denotes a rubber ring for preventing the slippage of the zoom ring 5 when it is operated, and the rubber ring 11 is inserted into the outer peripheral surface of the zoom ring 5. Reference symbol L denotes an optical axis serving as a center of travelling of a light from a subject. The rotation members such as the zoom ring 5 rotate around the optical axis L.

Cylindrical zoom cam barrel 21 is provided inside the zoom barrel 5. As illustrated in FIG. 3, a pair of protrusions 23 formed radially inwardly on the zoom ring 5 and a pair of protrusions 25 formed radially outwardly on the zoom cam barrel 21 are firmly coupled to each other by screws 27. Specifically, in this embodiment, the protrusions 23 and 25 and the screws 27 constitute a first connecting portion, so that the zoom ring 5 and the zoom cam barrel 21 are united. The zoom ring 5 and the zoom cam barrel 21 form an in integrated structure and are rotated by the photographer.

A plurality of cam protrusions 31 (three cam protrusions in this embodiment) are provided on the outer peripheral surface of the zoom cam barrel 21. The cylindrical straightly moving ring 33 is disposed between the zoom ring 5 and the zoom cam barrel 21, and each cam protrusion 31 of the zoom cam barrel 21 is engaged with the front and rear cam followers 35 and 37 provided protrusively on the inner peripheral surface of the straightly moving ring 33. Thus, when the zoom cam barrel 21, i.e. the zoom ring 5, rotates, the straightly moving ring 33 moves forward or backward along the optical axis L. Moreover, in the rear portion of the outer peripheral surface of the straightly moving ring 33, formed are a plurality of groove guides 39 (two groove guides in this embodiment) which are parallel with the optical axis L. The restraint protrusion 41 (restraint portion) protrusively formed extending from the front end of the fixed barrel 3 to the inside thereof is engaged with these guide grooves 39, whereby the rotation of the straightly moving ring 33 is restrained. In FIG. 3, reference numeral 43 denotes a pair of cut-away portions formed in the rear portion of the straightly moving ring 33, and the foregoing connecting protrusions 23 and 25 rotate within the range of the cut-away portions 43.

Focus ring 53 which holds the first lens group 51 composed of two lenses is provided in front of the straightly moving ring 33, and the cylindrical portion 55 thereof is fitted to the straightly moving ring 33 from the outside of the ring 33. While male helicoid screw 57 is formed on the outer peripheral surface of the straightly moving ring 33, female helicoid screw 59 is formed on the inner peripheral surface of the cylindrical portion 55 of the focus ring 53. These male and female helicoid screws 57 and 59 are engaged with each other. Therefore, when the photographer rotates the focus ring 53, the focus ring 53 moves forward or backward along the optical axis L with respect to the straightly moving ring 33 depending on the direction and quantity of rotation of the focus ring 53.

On the other hand, a plurality of helicoid cam grooves 61 (three grooves in this embodiment) are formed on the inner peripheral surface of the zoom cam barrel 21. The lens holder 65 which holds the second lens group 63 composed of four lenses is inserted inside the zoom cam barrel 21. The protrusion 67 protrusively formed in the outer peripheral surface of a lens holder 65 is engaged with the cam groove 61 of the zoom cam barrel 21. Moreover, a guide groove 69 is formed in the outer peripheral surface of the lens holder 65, and a straight movement interlocking key 71 fixed to the fixed barrel 3 by a screw is engaged with the guide groove 69. Thus, since the rotation of the lens holder 65 is restrained, when the zoom cam barrel 21, i.e. the zoom ring 5 rotates, the lens holder 65 moves forward or backward along the optical axis L.

In the case of this embodiment, a driving ring 81 is rotatively held inside the fixed barrel 3 in a state where the ring 81 is disposed immediately at the rear of the protrusions 23 and 25 of the zoom ring 5 and zoom cam barrel 21. As shown in FIGS. 2 and 3, fork-shaped connection keys 83 are extensively provided on the front end surface of the driving ring 81 at intervals of 180°. Each of the connection keys 85 prolongedly provided on the rear end surface of the focus ring 53 is engaged with the corresponding one of the connection keys 83. Specifically, in this embodiment, the connection keys 83 and 85 constitute a second connection portion. Therefore, although the focus ring 53 and the driving ring 81 rotate unitedly, both are allowed to make a forward or backward relative motion, i.e. in the direction of the optical axis. In the drawing, reference numeral 87 denotes a sector gear formed in a part of the driving ring 81. The sector gear 87 is engaged with a coupling gear 95 on the lens side. The end surface **95*a* of the gear 95 is brought into engagement with a driving coupling (not shown) on the camera side. Reference numeral 3*a* denotes a relief clearance provided in the fixed barrel 3 for the coupling gear 95**.

As described above, in this embodiment, the first connecting portion composed of the protrusions 23 and 25, the restraint portion composed of the restraint protrusion 41 and the second connecting portion composed of the connection keys 83 and 85 are disposed on the same section perpendicular to the optical axis L, for example, on the section A—A in FIG. 1 shown in FIG. 3, whereby the total length of the apparatus could be shortened considerably compared to the foregoing conventional apparatus. Moreover, since the zoom lens barrel of this embodiment is designed such that the driving ring 81 is disposed inside the fixed barrel 3, it becomes possible to shorten the outer diameters of the zoom ring 5 and the like, whereby the size of the zoom lens barrel can be made smaller.

Next, an operation of the zoom lens barrel will be described.

The photographer appropriately rotates the zoom ring 5, when he performs zooming on a object. Upon the rotation of the zoom ring 5, the zoom cam barrel 21 united with the zoom ring 5 rotates, so that the straightly moving ring 33, i.e. the focus ring 53, and the lens holder 65 move forward or backward. Thus, the distance between the first lens group 51 held by the focus ring 53 and the second lens group 63 held by the lens holder 65 changes continuously, whereby zooming is realized. For an auto-focussing, the driving coupling of the camera rotates the lens coupling 95, so that the driving ring 81 is allowed to rotate appropriately, and the focus ring 53 also rotates by the same angle through the connection keys 83 and 85. Thus, the focus ring 53 makes a helicoidal forward or backward motion with respect to the straightly moving ring 33. As a result, zooming is realized. Noted that for a manual focussing, the photographer rotates the focus ring 53 by hand.

As described above, in the zoom lens barrel of this embodiment, the connecting protrusions 23 and 25 for connecting the zoom ring 5 and the zoom cam barrel 21, the restraint protrusion 41 which is formed in the fixed barrel 53 and restrains the rotation of the straightly moving ring 33, and the connection keys 83 and 85 for connecting the focus ring 53 and the driving ring 81 are disposed on the same section plane perpendicular to the optical axis L, and the driving ring 81 is disposed inside the fixed barrel 3, so that small size and light weight for the zoom lens barrel of this embodiment can be realized, while maintaining zooming and focussing mechanisms thereof.

Figure 4:
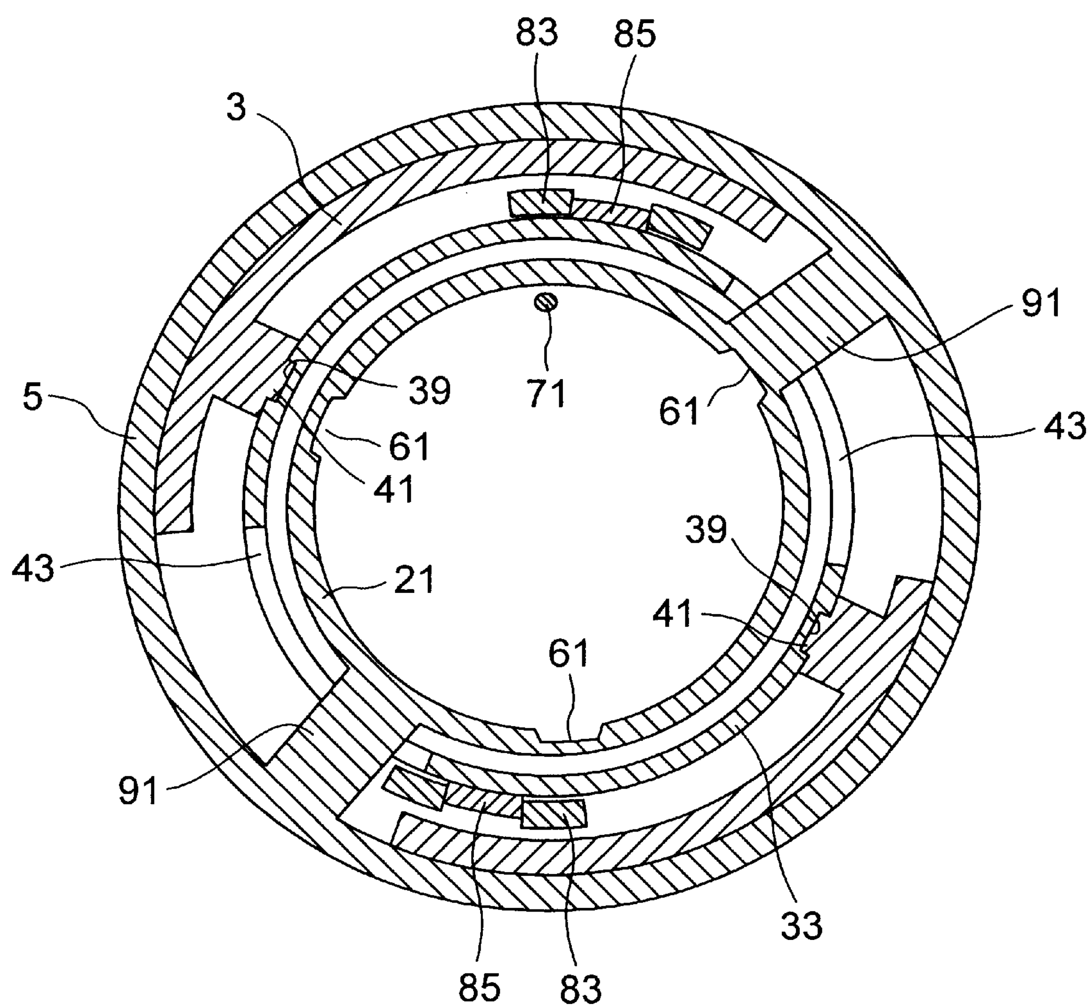
FIG. 4 is a sectional view showing a zoom lens barrel according to a second embodiment of the present invention, in which a zoom ring and a zoom cam barrel are molded to form an integrated structure.

The present invention is not limited to this embodiment. For example, in the foregoing embodiment, a zoom lens barrel is designed such that the zoom ring and the zoom cam barrel are individual parts and are tightly coupled by a screw. As shown in FIG. 4, the zoom ring 5, the zoom cam barrel 21 and the connecting portion 91 may be formed as an integrated structure, thereby reducing the number of parts as well as assembly steps. Moreover, in this embodiment, though the present invention is applied to the zoom lens barrel having the two lens groups, the present invention may be applied to a zoom lens barrel having three lens groups or more. Moreover, also concrete constitutions of the zoom and focussing mechanisms are not limited to the example of the foregoing embodiments, and they may be suitably modified according to convenience of designing.

According to the present invention, in the zoom lens barrel comprising the zoom ring which is supported by the fixed barrel so as to freely rotate and is rotatively driven; the zoom cam barrel which is disposed inside the zoom ring and serves to move the optical lens group forward or backward in the direction of the optical axis; the first connecting portion which connects the zoom ring and the zoom cam barrel; the straightly moving ring moves forward or backward along with the zoom cam ring, the rotation thereof being restrained by the restraint portion formed in the fixed barrel; the driving ring which is supported by the fixed barrel so as to freely rotate and rotatively driven at the time of focussing; the focus ring which holds the optical lens group composed of at least one optical lens and is fitted to the straightly moving ring by screwing, the focus ring moving forward or backward in the direction of the optical axis along with the rotation of the straightly moving ring; and the second connecting portion which connects the focus ring and the driving ring, in at least one spot of the zoom lens barrel the first connecting portion, the restraint portion and the second connecting portion are disposed on the same section plane perpendicular to the optical axis. Consequently, the zoom ring and the zoom cam barrel which constitute the zoom mechanism and the driving ring and the focus ring which constitute the focus mechanism are disposed closely to each other, so that reductions in the length and the weight of the zoom lens barrel are achieved.

Although the preferred embodiments of the present invention have been described in detail, it should be understood that various changes, substitutions and alternations can be made therein without departing from spirit and scope of the inventions as defined by the appended claims.

What is claimed is:

1. A zoom lens barrel comprising:

a zoom ring supported by a fixed barrel so as to be freely rotative, the zoom ring being driven rotatively at the time of zooming;

a zoom cam barrel disposed inside said zoom ring, the zoom cam barrel serving to move an optical lens group forward and backward in a direction of an optical axis;

a first connecting portion for connecting said zoom ring and said zoom cam barrel;

a straightly moving ring which is restrained from rotating by a restraint portion formed in said fixed barrel and moves forward or backward along with said zoom cam barrel;

a driving ring which is supported by said fixed barrel so as to be freely rotative and driven rotatively at the time of focussing;

a focus ring which holds an optical lens group composed of at least one optical lens and is fitted to said straightly moving ring by screwing, the focus ring rotating to move forward or backward in the direction of the optical axis; and a second connection portion which connects said focus ring and said driving ring rotatable together but movable in the direction of the optical axis relative to each, wherein in at least one spot of said zoom lens barrel, said first connecting portion, said restraint portion and said second connecting portion are disposed on the same section plane perpendicular to the optical axis.

2. The zoom lens barrel according to claim 1, wherein said driving ring is disposed inside said fixed barrel.

3. The zoom lens barrel according to claim 1, wherein said zoom ring, said zoom cam barrel and said first connecting portion are molded to form an integrated structure.

4. The zoom lens barrel according to claim 1, wherein said zoom ring and said zoom cam barrel are connected by said first connecting portion by means of a screw.

5. A zoom lens barrel comprising:

a zoom ring which is supported by a fixed ring constituting a barrel body, the zoom ring being manually operated so as to rotate at the time of zooming;

a zoom cam ring disposed inside said zoom ring in a diameter direction of said zoom ring;

a first connecting portion which integrally connects said zoom ring and said zoom cam ring;

a lens holder which holds a first lens and moves in a direction of an optical axis by a rotation of said zoom cam ring;

a driving ring which is supported to said fixed barrel at a position behind a lens from said first connecting portion so as to be freely rotative, said driving ring being rotatively driven at the time of focussing;

a straightly moving ring which is disposed substantially within an annular space defined in the radial direction by said zoom ring and said zoom cam ring and is restrained from rotating by said fixed ring, said straightly moving ring moving in a direction of an optical axis by a rotation of said zoom cam ring;

a lens holding ring which holds a second lens and is disposed at a position in front of the first lens from said first connecting portion so that said lens holding ring is substantially coupled to said straightly moving ring helicoidally within said annular space; and a second connecting portion which connects said driving ring and said lens holding ring so that said lens holding ring may be rotatively driven by said driving ring and is movable in the direction of the optical axis relative to said driving ring, said second connecting portion being located apart from said first connecting portion, and said second connecting portion and said first connecting portion being in a common plane which is perpendicular to the optical axis, wherein said lens holding ring moves through said straightly moving ring in the direction of the optical axis by a rotative drive of said driving ring at the time of focussing, thereby performing the focussing, and said lens holder and said lens holding ring move in the direction of the optical axis by operating said zoom ring at the time of zooming, thereby performing zooming.

6. The zoom lens barrel according to claim 5, wherein said zoom ring and said zoom cam ring are connected by said first connecting portion by a screw.

7. The zoom lens barrel according to claim 5, wherein said zoom ring, said zoom cam ring and said first connecting portion are united to form a unitary integrated structure.

* * * * *